Figure 1:
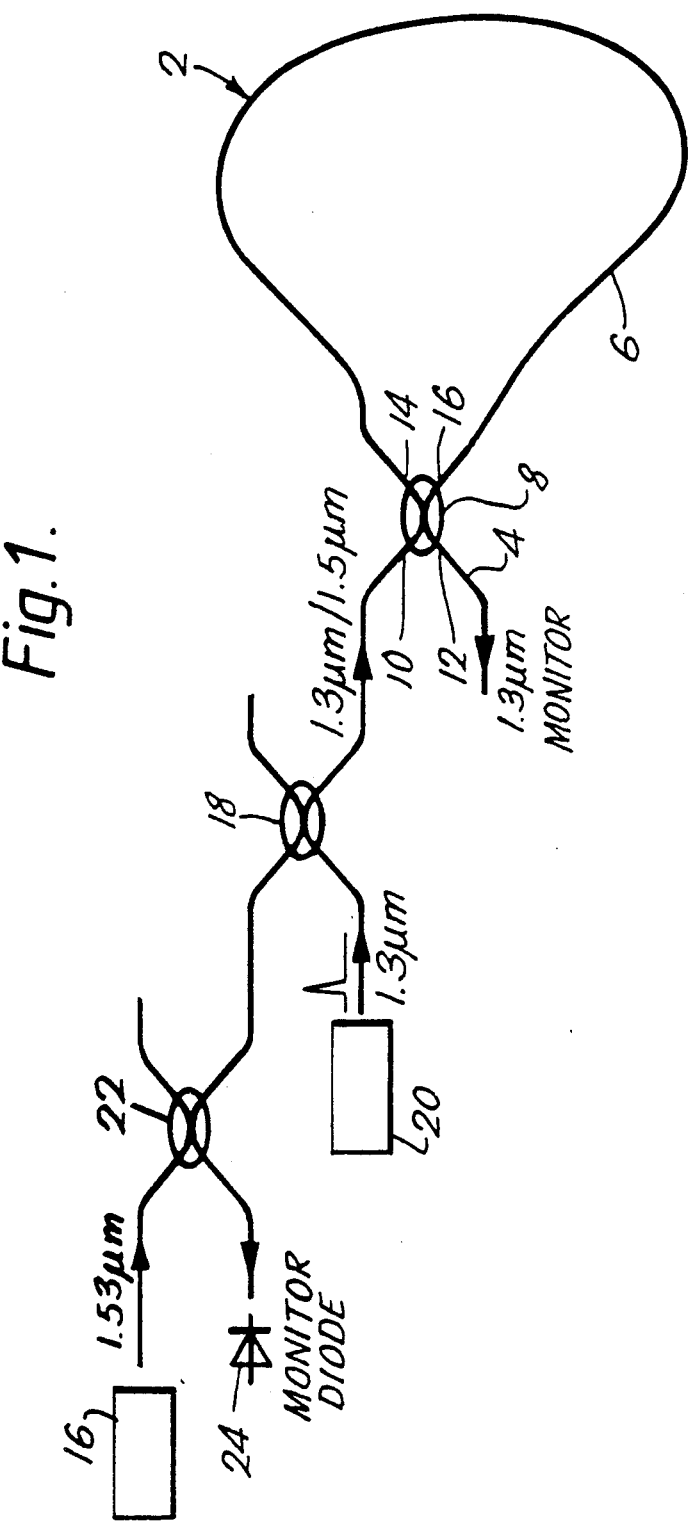
Figure 3C:
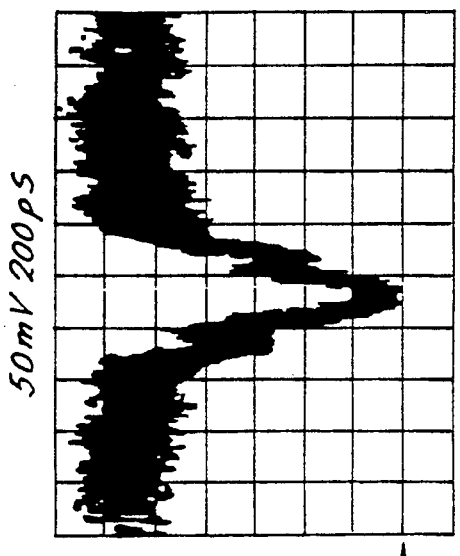
Figure 3D:
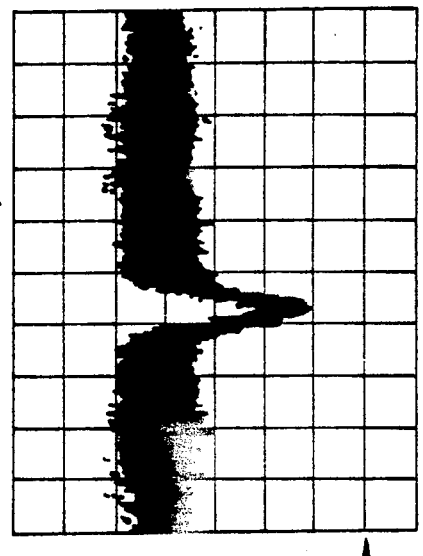
Figure 3A:
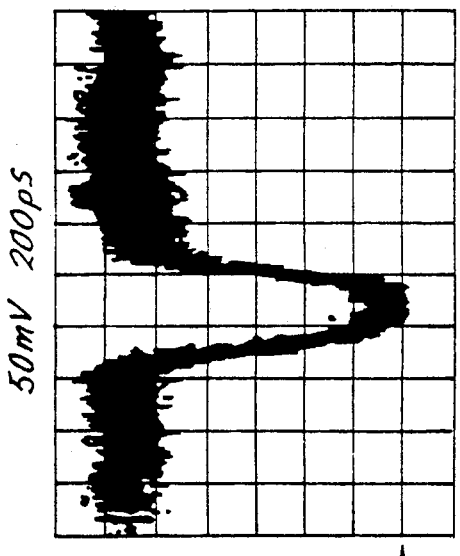
Figure 3B:
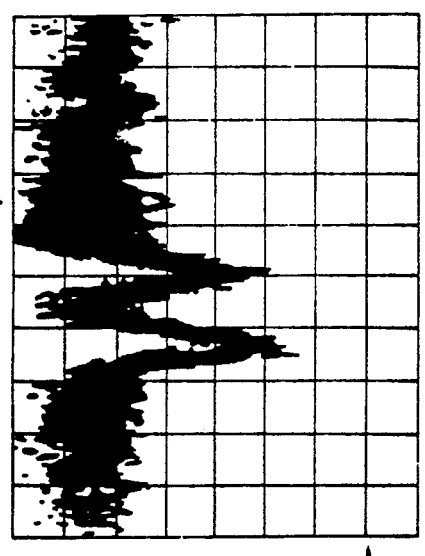

_

United States Patent [19]

Nelson et al.

[11] Patent Number: 5,208,455
[45] Date of Patent: May 4, 1993

[54] SQUARE OPTICAL PULSE GENERATOR

[75] Inventors: Brian P. Nelson; Keith J. Blow, both of Woodbridge; Nicholas J. Doran, Stratford-upon-Avon, all of England

[73] Assignee: British Telecommunications plc, London, England

[21] Appl. No.: 842,342

[22] PCT Filed: Sep. 14, 1990

[86] PCT No.: PCT/GB90/01422
§ 371 Date: Mar. 25, 1992
§ 102(e) Date: Mar. 25, 1992

[87] PCT Pub. No.: WO91/04593
PCT Pub. Date: Apr. 4, 1991

[30] Foreign Application Priority Data

Sep. 15, 1989 [GB] United Kingdom ............... 8920913

[51] Int. Cl.$^5$ ............................................... H01J 5/16
[52] U.S. Cl. ............................... 250/227.19; 356/350
[58] Field of Search ................... 250/227.24, 227.19; 356/350, 345; 385/12

[56] References Cited

U.S. PATENT DOCUMENTS 5,046,848  9/1991  Udd .................................... 356/350
5,056,919 10/1991  Arditty et al. .................... 356/350

OTHER PUBLICATIONS

Conference on Lasers and Electro-Optics, Technical Digest Series, Ahaheim, Calif., vol. 7, Apr. 25-29, 1988, abstract No. TUP5, Optical Society of America, (Washington, US), L. F. Mollenauer et al: "Demonstration of soliton transmission over >1000 km in fiber with loss with loss compensated by Raman gain", pp. 132-133.

Optics Letters, vol. 11, No. 3, Mar. 1986, Optical Society of America, (Washington US), A. M. Weiner et al: "Synthesis of phase-coherent, picosecond optical square pulses", pp. 153-155.

Optics Letters, vol. 13, No. 4, Apr. 1988, Optical Society of America, (Washington, US), A. M. Weiner et al: "Encoding and decoding of femtosecond pulses", pp. 300-302.

Optics Letters, vol. 13, No. 1, Jan. 1988, Optical Society of America, (Washington, US), N. J. Doran et al: "Nonlinear-optical loop mirror", pp. 56-58.

Journal of the Optical Society of America B/Optical Physics, vol. 5, No. 8, Aug. 1988, Optical Society of America, (Woodbury, N.Y., US), A. M. Weiner et al: "High-resolution femtosecond pulse shaping":, pp. 1563-1572.

Primary Examiner—David C. Nelms
Assistant Examiner—K. Shami
Attorney, Agent, or Firm—Nixon & Vanderhye

[57] ABSTRACT

An all-optical fibre Sagnac antiresonant interferometer (2) is formed from an optical fibre having a non-linear refractive index. The coupler (8) is a dichroic coupler coupling equal portions of a cw optical signal at 1.53 $\mu$m from laser (16) to ports (14 and 16) and all of a pulsed optical signal from laser (20) to port (14). The intensity of the pulsed optical signal is sufficient to provide a relative phase shift in the counter propagating 1.53 $\mu$m signals. The loop (6) is longer than the inverse of the absolute difference in group delays of the cw and pulsed optical so causing a square optical pulse at 1.53 $\mu$m to be switched to port (12) of the coupler.

6 Claims, 3 Drawing Sheets

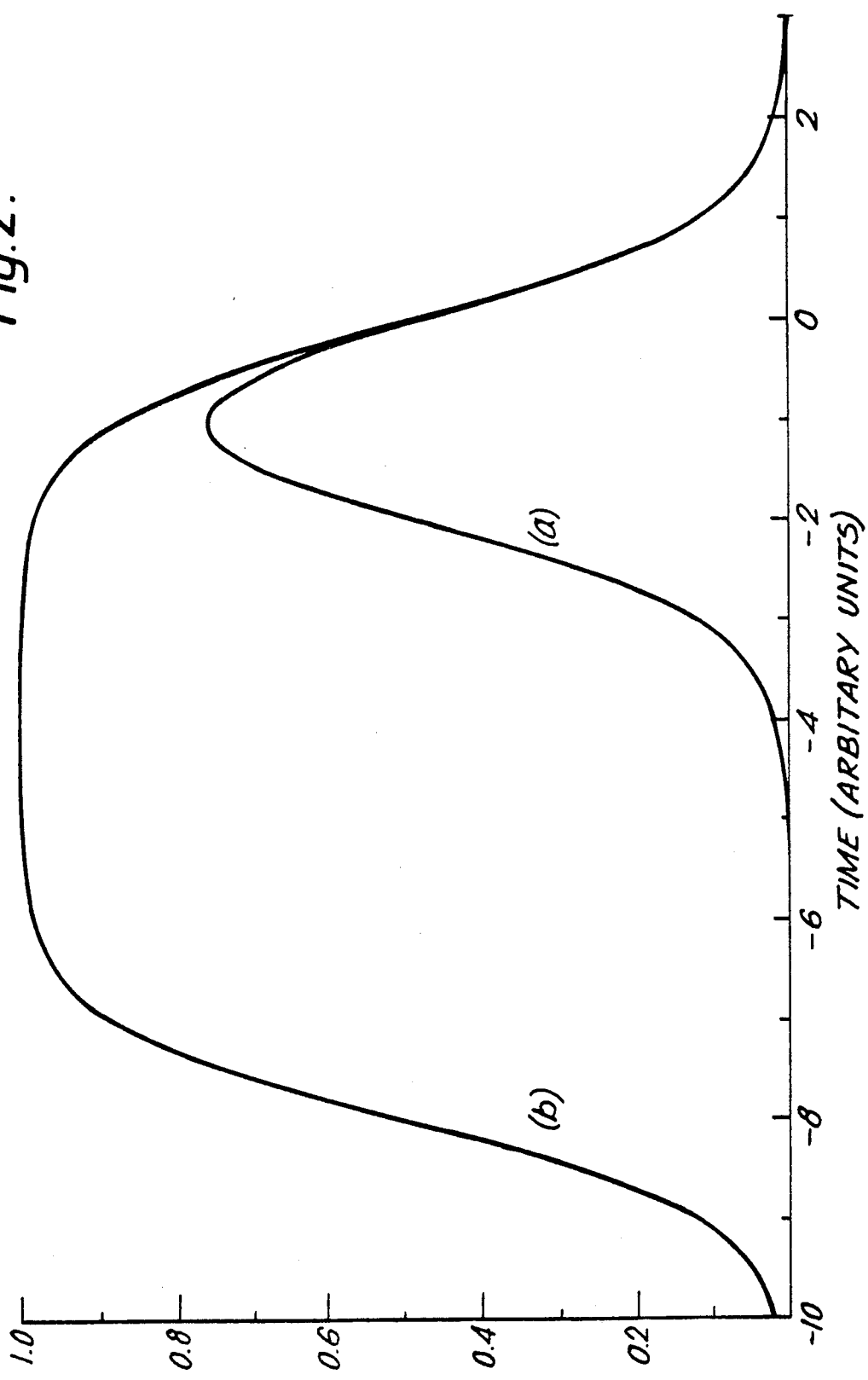

SQUARE OPTICAL PULSE GENERATOR

This invention relates to square optical pulse generators.

Considerable effort has been employed in generating square optical pulses for all-optical switching purposes using spatial transform techniques as discussed for example in an article by A. M. Weiner et al entitled "Femtosecond Pulse Tailoring" published in Optics Letters 13, 300 (1988).

This method requires suitable mask to be made which is an involved procedure and the transformation must be carried out in bulk optics which is inconvenient when the square pulses produced are to be used in optical fibre devices or networks.

According to the present invention an optical pulse generator comprises a first optical coupler having a first and a second pair of optical communication ports in which substantially equal first signal portions of an optical signal at a first wavelength received at a port of one pair are coupled to the two ports of the other pair of ports;

an optical waveguide coupling together the second pair of ports having an interaction section which includes a material having a non-linear refractive index;

a cw optical source for providing a cw optical signal at the first wavelength optically coupled to a first port of the first pair of ports;

a pulsed optical source for providing a pulsed optical signal at a second wavelength optically coupled to the interaction section so the pulsed optical signal propagates along it in substantially one direction;

the intensity of the pulsed optical signal being sufficient to provide a relative phase shift in the first signal portions as they propagate round the optical waveguide and the interaction section being longer than the inverse of the absolute difference in group delays of the cw and pulsed optical signals.

In this specification by "non-linear" we means that the refractive index of a material varies with the intensity of the transmitted signal. Typically the refractive index n is given by the formula $n = n_o + n_2 /E/^2$ where $n_o$ is the linear refractive index, $n_2$ is the Kerr coefficient and $/E/^2$ the intensity of the transmitted signal.

In the absence of the pulsed optical signal the first optical coupler and the optical waveguide, which form a Sagnac antiresonant interferometer, act as a loop mirror to the cw optical signal in that the signal entering the coupler at the first port will be reflected i.e. it will exit form the same port. This is because the two counter-propagating portions maintain the same relative phase. When the pulsed optical signal propagates along the interaction section of the waveguide-so inducing a phase shift in the first portion which co-propagates with it in the same direction-the condition for reflection is broken and some of the cw optical signal will exit the second port. The present invention relies on the realisation that the group delays of the cw and pulsed signals are different so that for a sufficiently long interaction section the pulse can effect switching to the other port pulse of cw optical signal wider than the width of the pulse from the pulsed source. Thus a short pulse at the second wavelength can be used to provide a square optical pulse at the first wavelength which will have a rise and fall time of the order of the short pulse and a width dependant on the length of the interaction section.

Preferably, the first optical coupler is a dichroic optical fibre coupler substantially all of the pulsed optical signal received at one port of one pair to one port of the other pair and the optical waveguide is an optical fibre. The pulsed optical source being optically coupled to the first port as this provides in a simple manner both the two counter propagating cw portions at the first wavelength and propagation of the pulsed signal in a single direction around the optical fibre.

The pulsed optical source can be coupled to the interaction portion by other arrangements, for example by means of dichroic couplers in the optical fibre loop.

Other waveguides providing the necessary non-linearity may also be employed within the scope of the present invention.

Embodiments of the present invention and its principle of operation will now be described in more detail with reference to the accompanying drawings in which FIG. 1 is a schematic diagram of an experimental square optical pulse generator according to the present invention;

FIG. 2 is a graph of the calculated non-linear phases imposed on the cw optical signal by an optical pulse for different lengths of interaction section; and FIGS. 3a–d are photographs of square pulses generated by the apparatus of FIG. 2 for different powers of pulsed optical signal.

Referring to FIG. 1 a Sagnac antiresonant interferometer 2 is defined by a single silica optical fibre 4 formed into an optical fibre loop 6 with potions of the optical fibre being formed into a fused optical fibre coupler 8 having a first pair of ports 10, 12 and a second pair of ports 14, 16. In this embodiment the loop 6 provides an interaction section by providing an optical fibre exhibiting a non-linear refractive index. The fibre loop 6 was 500 m long and polarisation maintaining.

A modelocked Nd:YAG laser 20 provides a pulsed optical signal of the 130 ps pulse width at 1.3 μm which is coupled into the first port 10 by means of a dichroic coupler 18.

A continuous wave (cw) F-centre laser 16 provides a cw optical signal at 1.53 μm which is also coupled to the port 10 of the coupler 8 by means of the optical couplers 18 and 22.

The coupler 8 is manufactured in well known manner so as to couple equal portions of the cw optical signal coupled to port 10 to the ports 14 and 16 to produce two counterpropagating, equal intensity cw portions in the loop 6 and to couple substantially all of the pulsed optical signal into port 14 (an extinction ratio of 37 dB at 1.3 μm) so the pulsed signal propagates in only one direction round the loop 6.

The coupler 22 has a 50:50 splitting ratio at 1.53 μm and is included in this experimental arrangement to provide a monitoring point for the back reflected signal. The coupler 18 is a dichroic coupler in which both the 1.53 μm and 1.3 μm optical signals are combined.

The performance of the device was monitored at coupler 22 with a photodiode 24 which had a pulse response of 70 ps FWHM and the output displayed on a sampling oscilloscope (not shown). The signal at this monitor diode is the 1.53 μm signal alone because none of the 1.3 μm pulsed optical signal returns to this port. The average power of the 1.3 μm signal in the loop is measured at the free output port 12 of coupler 8.

Consider now when a cw optical signal at 1.53 μm and a pulsed optical signal at 1.3 μm are propagating round the loop 6. Under these conditions the portion of the cw signal co-propagating in the same direction and with the pulsed optical signal can be described by the following pair of coupled equations in normalised units.

$$i\left(\frac{\partial A}{\partial z} + \beta_A' \frac{\partial A}{\partial t}\right) = |A|^2 A + 2|B|^2 A \tag{1a}$$

$$i\left(\frac{\partial B}{\partial t} + \beta_B' \frac{\partial B}{\partial t}\right) = \frac{\omega_B}{\omega_A}(|B|^2 B + 2|A|^2 B) \tag{1b}$$

In equations 1, A is the pulse signal (high power) and B is the cw signal (low power) which is propagating in the same direction as A. The group delay is given by $\beta'_A$ and $\beta'_B$ for the appropriate waves. Since B is small we can neglect terms of order $B^2$. In addition, if we transform into the frame moving with the group velocity of the B wave then equation (1) becomes $$i\left(\frac{\partial A}{\partial z} + \Delta\beta' \frac{\partial A}{\partial t}\right) = 0 \tag{2a}$$

$$i\frac{\partial B}{\partial t} = 2\frac{\omega_B}{\omega_A}|A|^2 B \tag{2b}$$

where $$\Delta\beta' = \beta_A' - \beta_B' \tag{3}$$

is the difference in group delays of the two waves. Note, we have also neglected the SPM of the pulse signal since the nonlinear response is unaffected by this term.

The solution for A is simply a traveling wave given by $$A(z,t) = p_A^{\frac{1}{2}}(t - \Delta\beta' z) \tag{4}$$

The equation for B can now be integrate to give $$B(z,t) = B(0,t)\exp i\left\{\frac{2\omega_B}{\omega_A}\int_0^L P_A \times (t - \Delta\beta' z)dz\right\} \tag{5}$$

where L is the length of the loop 6. Equation (5) is exact even when SPM is included in the pump. The expression in brackets in equation (5) represents the phase change $\phi$ of the CW B signal caused by the pulse signal $P_a(t)$. The reflected B signal from the loop mirror can be simply expressed in terms of this phase as $$B_{ref} = B(1 + \cos(\phi))B_{in}/2 \tag{6}$$

(see N. J. Doran and D. Wood, "Non-linear Optical Loop Mirror" Optics Lett 13 56–58 (1988).). This expression shows that the low power B signal is modulated by the high power A signal pulse. In addition, the difference in group delay between the two signals leads to a broadening of the reflected pulse because the phase $\phi$ depends upon the integral of the pump pulse $P_A(t)$. As an example, if the A signal is given by $$A(t) = U \operatorname{sech}(t) \tag{7}$$

then the nonlinear phase change is given by $$\phi(t) = U^2(\tanh(t) - \tanh(t) - \Delta\beta' L)/\Delta\beta' \tag{8}$$

Referring to FIG. 2 there is shown the nonlinear phase for two loop lengths. FIG. 2a is the result for a loop length which is small compared to the pulse walk off length $1/(\Delta\beta')$. The nonlinear phase is similar to the SPM result in which the phase is proportional to the pump pulse shape. In FIG. 2b the loop length is large compared to the walk off length. The peak phase change is larger, since we are now utilising all the available interaction length, and is constant between the leading and trailing edge so forming the required square optical pulse.

The results for a number of different pump powers are shown in FIG. 3. At an average (peak) power of 20 mW (2W) at 1.3 μm (FIG. 3a) we observe complete switching of the 1.53 μm probe signal. However, inspection of FIG. 3a shows the 1.5 μm pulse to be flat topped with a width of 300 ps. This is due to the difference in group delay between the two signals as explained above. As the pump power is further increased (FIGS. 3b,c) we start to observe the periodic intensity response of the nonlinear loop mirror. In FIG. (3b) the central part of the pulse is now fully reflected. However, the leading and trailing edges which should go through a stage of zero reflection appear not to. This is merely due to the limited response of the photodiode. The photodiode response time is not a problem in the central part of the pulse since the flat region of phase (see FIG. 1b) is longer than this response time. Similar instrument limited features can also be seen in FIG. (3c). The number of cycles we can observe is limited by the onset of stimulated Raman scattering which occurs here at an average power of 110 Mw. Any further increase in power above this value does not produce any increase in peak power at 1.3 μm but simply transfers power to the longer wavelengths.

We claim:
1. A square optical pulse generator comprising:
   a first optical coupler (8) having a first and a second pair of optical communication ports (10, 12 and 14, 16) in which substantially equal first signal portions of an optical signal at a first wavelength received at a port (10) of one pair are coupled to the two ports (14,16) of the other pair of ports;
   an optical waveguide (6) coupling together the second pair of ports having an interaction section which includes a material having a non-linear refractive index;
   a cw optical source (16) for providing a cw optical signal at the first wavelength optically coupled to a first port (10) of the first pair of ports (10, 12);
   a pulsed optical source (20) for providing a pulsed optical signal at a second wavelength optically coupled to the interaction section (6) so the pulsed optical signal propagates along it in substantially one direction;
   the intensity of the pulsed optical signal being sufficient to provide a relative phase shift in the first signal portions as they propagate round the optical waveguide (6) and the interaction section being longer than the inverse of the absolute difference in group delays of the cw and pulsed optical signals.
2. A pulse generator as claimed in claim 1 in which the first optical fibre coupler is a dichroic optical coupler (8) coupling substantially all of the pulsed optical signal received at one port of one pair (10, 12) to one port of the other pair (14, 16), the pulsed optical source (20) being optically coupled to the first port (10).

3. A pulse generator as claimed in claim 2 in which the pulsed optical signal and cw optical signal are combined by means of a second dichroic optical coupler (18) having an output port coupled to the first port (10) of the first optical coupler (8).

4. A pulse generator as claimed in claim 2 in which the pulsed optical source (20) is coupled into the optical waveguide (6) by means of a dichroic coupler (8).

5. A pulse generator as claimed in claim 1 in which the optical waveguide (6) comprises an optical fibre.

6. A pulse generator as claimed in claim 1 in which each optical coupler (8) comprises an optical fibre coupler.

* * * * *